G. W. DONER.
INCUBATOR ATTACHMENT.
APPLICATION FILED JAN. 21, 1918.
1,297,114.
Patented Mar. 11, 1919.
2 SHEETS—SHEET 1.
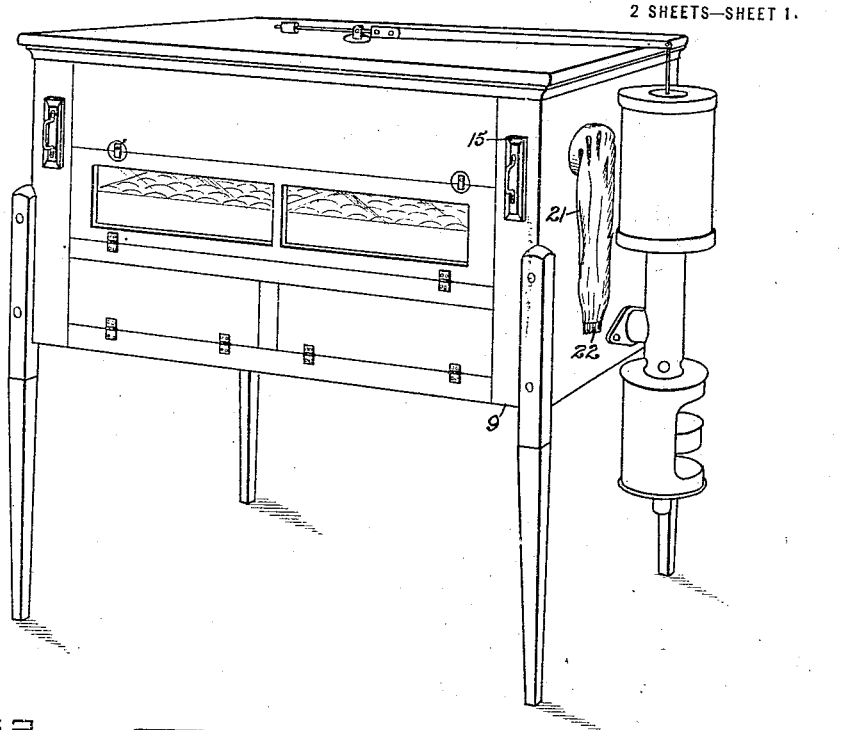
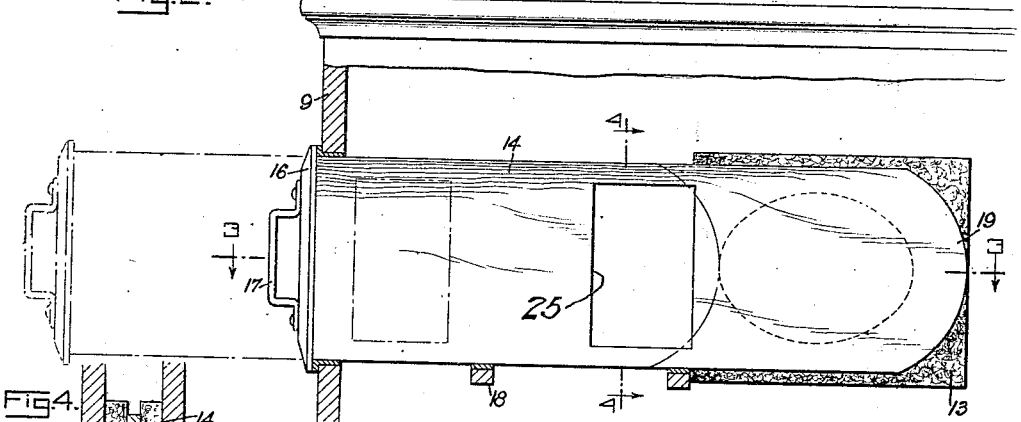
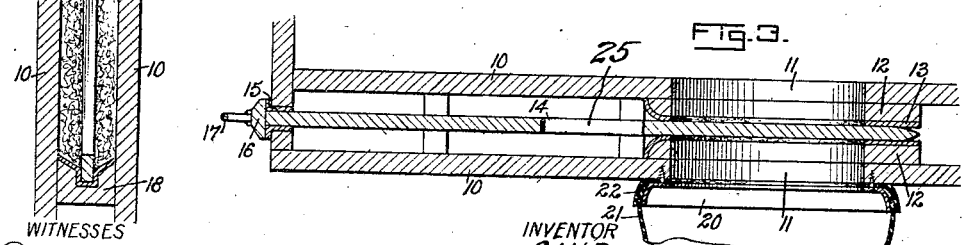
WITNESSES
INVENTOR
G. W. Doner
BY
ATTORNEYS G. W. DONER.
INCUBATOR ATTACHMENT.
APPLICATION FILED JAN. 21, 1918.
1,297,114.
Patented Mar. 11, 1919.
2 SHEETS—SHEET 2.
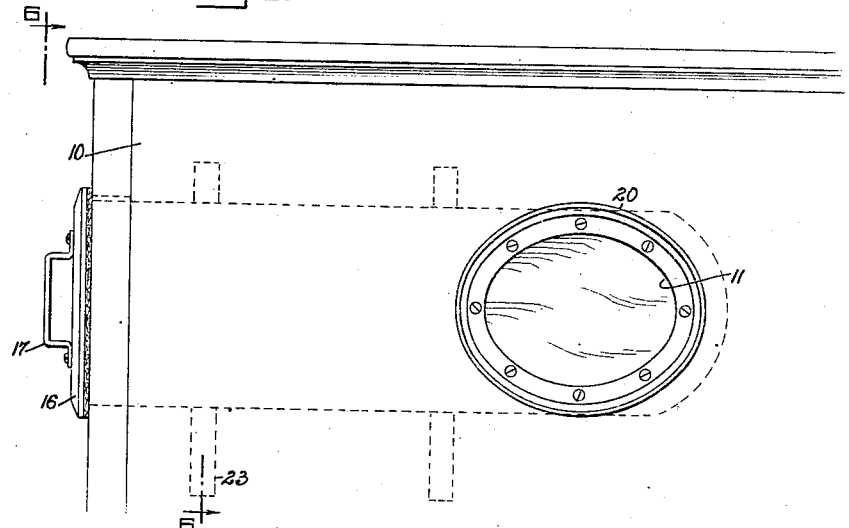
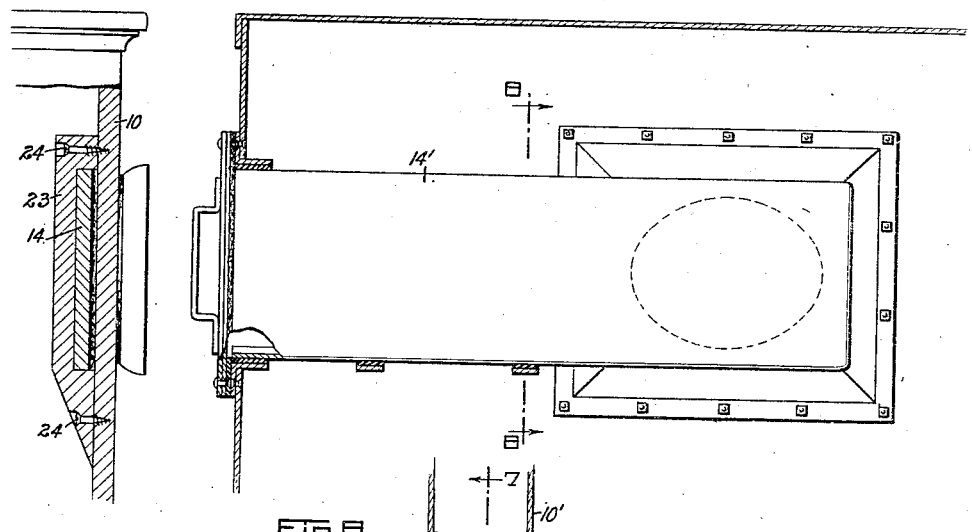
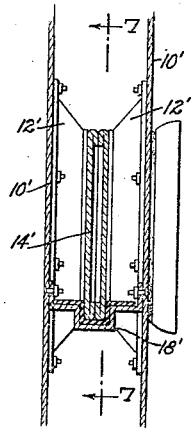
WITNESSES
INVENTOR
G. W. Doner
BY
ATTORNEYS

UNITED STATES PATENT OFFICE.

GEORGE WARD DONER, OF OSCEOLA, SOUTH DAKOTA.

INCUBATOR ATTACHMENT.

1,297,114.      Specification of Letters Patent.      Patented Mar. 11, 1919.

Application filed January 21, 1918. Serial No. 212,925.

*To all whom it may concern:*

Be it known that I, GEORGE W. DONER, a citizen of the United States, and a resident of Osceola, in the county of Kingsbury and State of South Dakota, have invented a new and Improved Incubator Attachment, of which the following is a full, clear, and exact description.

My invention relates to an attachment for incubators, and it has reference to means whereby access may be had to the interior of an incubator without affecting the atmospheric conditions within the incubator, for instance, when removing hatched chicks while there are eggs which have not been hatched, or when removing egg shells to prevent injury to chicks to be hatched.

An object of the invention is to provide a simple and efficient attachment which can be applied to existing incubators or to incubators to be built.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a perspective view of an incubator provided with an attachment embodying my invention;

Fig. 2 is a vertical section through the attachment showing its location within the incubator;

Fig. 3 is a horizontal section on line 3—3, Fig. 2;

Fig. 4 is a vertical cross section on line 4—4, Fig. 2;

Fig. 5 is a fragmentary side elevation of the incubator showing the sleeve of the attachment removed;

Fig. 6 is a cross section on line 6—6, Fig. 5, illustrating a modified arrangement of the attachment from that shown in the previously mentioned figures;

Fig. 7 is a vertical section through an incubator built of metal, on line 7—7, Fig. 8; and Fig. 8 is a vertical cross section on line 8—8, Fig. 7.

All eggs hatched in incubators or otherwise do not hatch evenly or at the same time. A hatch often consumes from one to two days; and the first hatch gradually clusters about or over the unhatched eggs and, in consequence, may telescope them and cause injury to otherwise strong and healthy fowls. Nature demands the exclusion of outside air at the time of hatching, but it is impossible to remove the hatched fowls from the incubator through the access-giving means now provided in incubators without exposing the interior of the incubator to the outer atmosphere. I obviate this defect by providing an attachment whereby hatched fowls may be removed from the incubator without exposing the interior of the incubator to the effect of the outer atmosphere.

Referring to the drawings, particularly Figs. 1 to 4 inclusive, 9 is an incubator having double side walls 10 having alining oval openings 11 through which an arm may be inserted to reach any part of a tray in proximity to the side wall. At the apertures 11 the facing sides of the walls 10 are provided with gate guides 12 which are faced with yielding material 13, such as felt, for example.

Slidably mounted between the side walls 10 is a gate 14, preferably of rectangular contour. One end of the gate projects through the front of the incubator whereat a packing gland 15 is provided for the gate, which is preferably of felt. The projecting end of the gate is provided with a head 16 with means 17 for facilitating the manipulation of the gate. The movement of the gate within the incubator is guided by grooved blocks 18 provided at the lower edge of the gate between the side walls 10. The inner end 19 of the gate is preferably arcuated and formed into a knife edge to facilitate the engagement of the gate with the yielding members 13 without causing injury to said members. For the same reason the guides 12 have rounded edges at the ends which meet the gate when the same is moved into engagement with the guides.

The outer side wall 10 carries a ring 20 about the aperture 11. The ring tapers outwardly to receive the larger end of a sleeve 21 made of flexible material. Both ends of the sleeve are provided with contracting members 22 of suitable elastic material. The member 22 at the larger end of the sleeve grips the sleeve to the ring and retains the same thereat, in a manner best shown in Fig. 1. The length of the sleeve must be such that it will not move on the arm when the hand is moved into the incubator to reach any part of the tray.

When the side wall of the incubator is single, as shown in Figs. 5 and 6, the gate 14 is retained against the single side 10 by bearing blocks 23 recessed for the gate and secured to the side wall by screws 24, or any other suitable means. If the incubator is made of metal, as shown in Figs. 7 and 8, the gate 14′ is also made of metal members, the edges of which are turned in. This makes the gate hollow, while presenting smooth edges. The felt carriers 12′ are also made of metal. The blocks 18′ on which the gate 14′ bears are also of metal and lined with felt, to allow a noiseless operation of the gate within the incubator. The wooden blocks 18, previously referred to, are also lined in the same manner for the same purpose.

In the double-wall structure of the incubator, the part of the gate which in normal or closed position of the gate is outside or exterior of the opening may have apertures 25 to facilitate circulation of the hot air across that portion of the gate. It is self-evident that although in the description and disclosure the gates are shown in the sides of the incubator, they may as well be provided in the top, rear or front, if so desired with substantially the same effect.

Normally the sleeve is not on the ring, and when access is to be had to the interior of the incubator through the gate, the large end of the sleeve is engaged with the ring; the arm is then engaged into the narrow end of the sleeve by bringing it half way to the elbow. The gate is operated with the other hand. It is drawn far enough to clear the opening 11, when the hand can be inserted into the incubator for the desired operation. In withdrawing the hand from the incubator, before the same is disengaged from the sleeve, the gate may be closed; or, with the other hand, the sleeve may be pinched close to the ring and then the hand withdrawn. The sleeve remains pinched until the hand is returned for whatever other operation is necessary to be performed within the incubator. By making the sleeve detachable, the same sleeve can be used with the rings of all the incubators.

While I have described the principle of operation, together with the device which I now consider to be the best embodiment thereof, I desire to have it understood that the device shown is merely illustrative and that such changes may be made as are within the scope of the appended claims.

I claim:

1. An attachment for incubators, comprising a gate for a hand hole in the incubator, an outwardly flaring ring at the hole, and a member of substantially air tight flexible material secured to the ring.

2. In combination with an incubator having a hand hole, a yielding seat bordering said hole internally, a gate having a portion projecting out of the incubator, means for maintaining the gate in contact with the yielding seat, means for guiding the gate, an outwardly-tapering ring at the hand hole on the outside of the incubator, and a sleeve of substantially air tight pliable material removably associated with the ring.

3. In combination with an incubator having a hand hole, a gate within the incubator for the hole, felt interposed between the gate and the hole to provide a tight joint thereat, said gate having means outside of the incubator for facilitating the manipulation of the gate, felted guiding means for said gate, an outwardly-tapering annular member secured to the incubator at the outside about the hand hole, and a sleeve of substantially air tight pliable material in engagement with the ring, said sleeve having contracting members at the ends thereof.

GEORGE WARD DONER.

Copies of this patent may be obtained for five cents each, by addressing the "Commissioner of Patents, Washington, D. C."